March 4, 1958
K. REINER
2,825,380
ANCHOR CAGE AND NUT
Filed Feb. 14, 1955
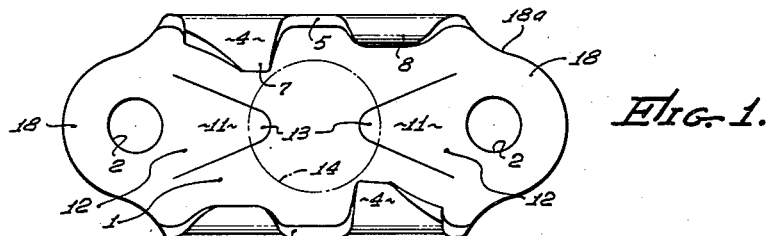
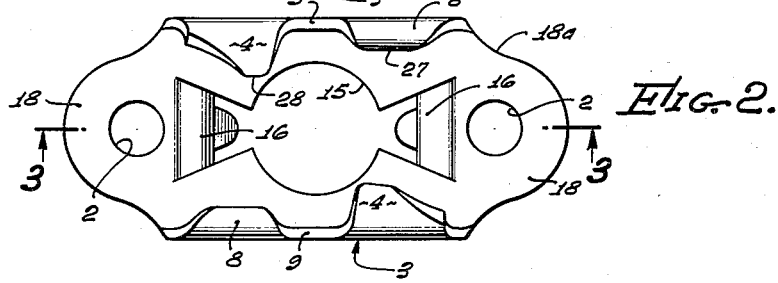
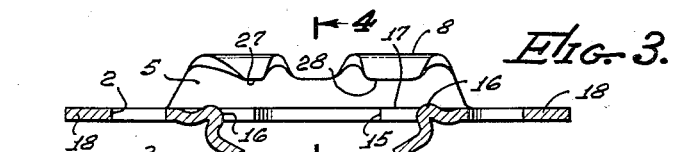
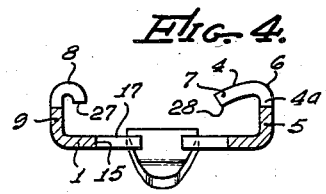
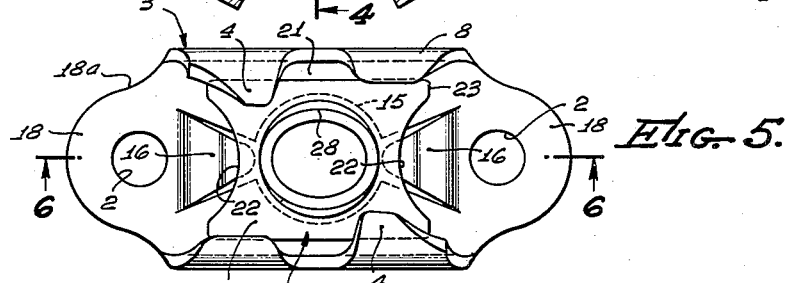
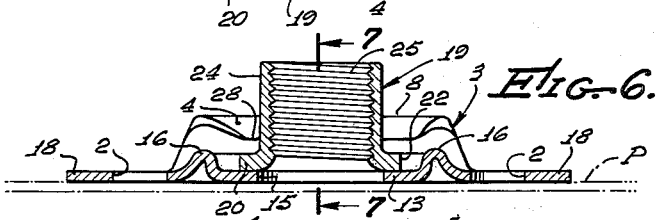
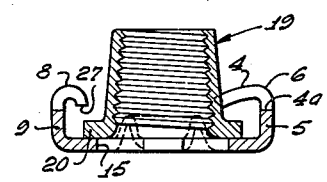
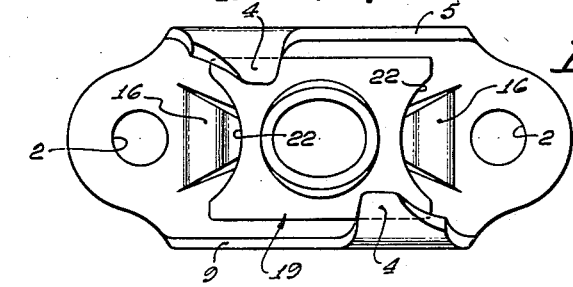
KENNETH REINER
INVENTOR.
BY *Lyon & Lyon*
ATTORNEYS United States Patent Office 2,825,380
Patented Mar. 4, 1958

2,825,380

ANCHOR CAGE AND NUT

Kenneth Reiner, Los Angeles, Calif.

Application February 14, 1955, Serial No. 487,869

5 Claims. (Cl. 151—41.76)

In airplane and other constructions many parts are connected together by means of a bolt and nut in a situation where it is difficult to mount them accurately in line with each other prior to assembly.

In such a situation it is the practice to mount the nut in a holder commonly called an "anchor cage" that will retain the nut, but will permit a certain amount of lost motion that will enable the nut to be brought into axial alignment with a bolt, threaded rod or the like.

This invention relates to such means for holding or anchoring such a nut while giving it some freedom of movement laterally in all directions.

In practice, the anchor cage is usually riveted to a supporting plate, and is provided with means for limiting movements of the nut both axially and laterally. In other words, the anchor cage holds the nut in position, at the same time permitting limited free motion of the nut laterally with respect to its axis, and in addition to that the anchor cage has portions which engage the nut so that it cannot be moved to any considerable distance away from its seat. This function of the anchor cage is quite important, because when the bolt or threaded member is thrust through the anchor cage to insert its threaded end and rotate it in the threaded sleeve of the nut, considerable endwise force is exerted against the end of the nut, and this force must be resisted by what is called in the trade the "push-out" strength of the anchor cage that holds the nut in place.

One of the objects of this invention is to provide a light-weight anchor cage with a plate-form body having novel means associated with it for permitting a limited amount of transverse movement of the nut.

Another object of the invention is to accomplish this by providing stops of novel form for limiting such movements of the nut by employing integral parts of the plate-form body of the anchor cage.

Another object of the invention is to provide a form for the anchor cage in which portions of the side edges thereof are utilized as the means for giving the anchor cage the "push-out" resistance referred to above; and to give the cage a form which facilitates the assembly of the nut member into the cage between the stops referred to.

Further objects of the invention will be evident from the following specification and study of the accompanying drawing.

The invention consists in the novel parts and combinations of parts to be described hereinafter, all of which contribute to produce an efficient anchor cage and nut.

A preferred embodiment of the invention is described in the following specification, while the broad scope of the invention is pointed out in the appended claims.

In the drawings:

Figure 1 is a plan view of a partially formed blank.

Figure 2 is a plan of the same blank as shown in Figure 1 but illustrating the appearance of the same after another die operation to develop the stops from the body of this blank that will limit the lateral shifting of the nut along a transverse axis.

Figure 3 is a longitudinal section on the line 3—3 of Figure 2.

Figure 4 is a cross-section taken about on the line 4—4 of Figure 3.

Figure 5 is a plan view of the completed assembly, with the nut retained in the anchor cage.

Figure 6 is a section view taken along the line 6—6 of Figure 5.

Figure 7 is a section view taken on the line 7—7 of Figure 6.

Figure 8 is a plan illustrating a modified embodiment of the anchor cage and showing it with features which enable the weight of the anchor cage to be somewhat reduced, without materially reducing the lost-motion features or efficiency thereof.

Referring more particularly to the parts and especially to Figure 1, the uncompleted anchor cage shown in this figure includes a substantially flat plate-form body 1 provided at its ends with openings 2 for enabling the anchor cage 3 to be attached to a supporting part such as the plate indicated in dotted lines at "p" in Figure 6.

When the blank is struck out from plate stock, its longitudinal edges are provided with flanges 5 and 9 having extensions which are bent upwardly and inwardly from the plane of the plate, and include two relatively long extensions 4 that are preferably located so that they are out of line with each other transversely of the cage. As shown in Figure 4, these extensions stem from the edges of the flanges 5, and their roots 4a lie in a plane substantially at right angles to the plane of the plate-form body 1. Each extension 4 projects up from its flange 5, and the end of the extension is bent over to form a curved knuckle 6 beyond which its tip portion 7 bends inwardly and slightly downwardly somewhat as shown in Figure 4.

In addition to this the side edges of the plate-form body are provided with two other extensions shorter than the extensions 4, and one of these extensions 8 is shown at the other end and side (see Figure 4). These extensions are bent over in a return bend as indicated in Figure 4, beyond or above the edge of its corresponding vertical flange 9 that corresponds to the flange 5 shown in Figure 4, and which is likewise disposed substantially at a right angle to the plane of the plate-form body 1. Each of these short extensions 8 is located opposite to one of the long extensions 4. The flanges 5 and 9 function as stops to limit the lateral movement of the caged nut 10 along one transverse axis.

In order to form the means for limiting the floating movement of the nut in a direction parallel to the flanges 5 and 9, I place the plate in a press under dies that break down, and shear out two tapered tongues 11 with relatively wide root portions 12, and rounded tips 13. These tongues 11 are preferably located about on the longitudinal axis of the anchor cage, and the tips 13 actually project into the circular area 14 (see Figure 1), at which an opening 15 will later be punched out by a die. The opening 15 operates as a clearance space for the end of a bolt or threaded rod that will be thrust up through the plate "p" indicated in dotted lines in Figure 6, when such a bolt is screwed into the nut in the usual manner.

After the tongues 11 are cut out, forming dies (not shown) engage the tongues to form an upward bight or transversely extending roll 16 on each tongue.

The position of the tongues 11 at this stage is indicated in Figure 3, extending down in an inclined direction with the upper faces of the bights or ribs 16 located at or slightly above the upper face 17 of the plate-form body 1. The same die that cuts and breaks down the tongues 11 may carry punches to punch out the rivet openings 2, and such a die may also carry an edge portion to shear through the stock to give the curved peripheral line 18a to the end lobes 18 in which the rivet openings 2 are punched. This enables the tongues, the rivet openings 2, and the curved peripheral lines 18a for the lobes to be all made in one operation.

As a matter of fact, if desired, a punch for pushing out the arcs to form the clearance opening 15 may be employed as a follow-up part of the die assembly that breaks out the tongues, located so that it does not reach the plate-form body 1 until after the tongues with their tips 13 have been taken out from the portion or area of the plate within the boundary of the extended arcs that are left to define this clearance opening 15 for the bolt or threaded rod. (See Figure 2.)

The nut 19 that may be considered the "mate" for the anchor cage described above, includes a substantially flat base 20 having straight lateral side edges 21, and re-entrant arcuate end lines or edges 22 which, however, are struck with a radius short enough to leave short transverse extensions or edges 23 at the corners of the base plate 20. The nut 19 includes a sleeve 24 that is formed integrally with the base, and this sleeve 24 is initially of cylindrical form until after it has received its internal threads 25. Following the threading operation the upper portion of the sleeve may be deformed if desired into an oblong or elliptical shape, as shown in Figure 5, by pressing inward the lateral side faces 26 of the sleeve. This gives the nut the characteristics of a check-nut.

In assembling the nut 19 into the anchor cage 3, the base 20 of the nut is slid longitudinally into the channel formed above the plate-form body 1 between the flanges 5 and 9. It is moved in until it reaches a centered position with respect to the opening 15, after which the tongues 11 are forced upwardly from below so as to bring their bights or transverse ribs 16 up into position at the level of the arcuate end edges 22 of the base of the nut. This latter position is indicated in Figure 6. In this position the tips 13 are located substantially in the plane of the base 20 of the nut 19.

When the nut is in this position the bights 16 operate effectively as stops to limit the longitudinal shifting movement of the nut 19. Furthermore, the edges 27 and 28 of the extensions 4 and 8 are so near to the level of the upper face of the base 20 that they present a "ceiling" to stop any upward movement of the nut that could be sufficient to enable it to slip out over either one of the bights 16, and hence the nut is held captive in the anchor cage and remains in it after the anchor cage has been riveted to a support. And when that occurs, and a threaded member is being introduced into the threaded "bore" of the nut's sleeve, the anchor cage will permit the desirable lateral play or lost-motion of the nut required in this type of fastening.

The ribs 16 assist in resisting the tightening and loosening torque on the nut 19 during installation and removal of the bolt, not shown. The rigidity developed by their curved shape and their proximity to the attaching rivets, not shown, which extend through the openings 2, enable the ribs 16 to assist materially in preventing the nut 19 from rotating within the anchor cage 3. In this way the ribs 16 reduce the torque resisting requirements of the flanges 5 and 9. The side flanges 5 and 9 of the present invention have a cut-away central portion in place of the continuous upper inwardly turned flanges of the retaining grooves utilized in prior known anchor cages. This can be done without weakening the resistance to deformation or turning due to torque forces by reason of the material torque-resisting properties of the ribs 16 of the present invention. Since the width of an anchor cage must consist of the sum of the outside diameter of the nut body plus the lateral space required for floating plus the widths of two inwardly turned flanges in the vicinity of the area of movement of the nut body, it is readily apparent that eliminating the flanges at the central part of the anchor cage, as applicant has done, reduces the necessary over-all width of the cage considerably. The reduced size possibly by reason of this combination of structure also effects substantial savings in weight and these are extremely critical factors in aircraft constructions.

The modified form of my invention shown in Figure 8 is similar to that form previously described, except that the short extensions 8 are omitted. This modification has the advantage of light-weight and may be used in installations where high "push-out" strength is not required.

Having fully described my invention, it is to be understood that I do not wish to be limited to the details herein set forth, but my invention is of the full scope of the appended claims.

I claim:

1. In combination a nut and an anchor cage, said nut comprising a threaded sleeve portion having an integral base, said anchor cage being adapted to be attached to a supporting member and having means overlying portions of said nut to retain the nut in the anchor cage, said anchor cage having a plate-form bottom portion having an aperture therein for accommodating a threaded bolt, said bottom portion having means to limit longitudinal movement of said nut and to resist torque transmitted to said nut as by a bolt when inserted into or removed from said sleeve portion, said last-mentioned means including an integral tongue having a free end projecting toward said aperture in the plane of said bottom portion and underlying said base whereby forces tending to bend said tongue upwardly are resisted by retention of said free end of said tongue under said base, said tongue having a portion bent upwardly and then downwardly about bend lines transverse to the longitudinal axis of said bottom portion to form a transverse stiffened rib projecting into the path of movement of said base.

2. In combination a nut and an anchor cage, said nut comprising a threaded sleeve portion having an integral base, said anchor cage being adapted to be attached to a supporting member and having means overlying portions of said nut to retain the nut in the anchor cage, said anchor cage having a plate-form bottom portion having an aperture therein for accommodating a threaded bolt, said bottom portion having means to limit longitudinal movement of said nut and to resist torque transmitted to said nut as by a bolt when inserted into or removed from said sleeve portion, said last-mentioned means comprising a pair of opposed integral tongues the free ends of which project toward said aperture and underly said base, whereby forces tending to bend said tongues upwardly are resisted by the retention of the said free ends of the tongues under said base, each of said tongues having a portion thereof bent upwardly and then downwardly about bend lines transverse to the longitudinal axis of said bottom portion to form a transverse stiffened rib projecting into the path of movement of said base.

3. The combination of a nut having a threaded sleeve and a base integral therewith and an anchor cage for said nut, said anchor cage being adapted to be secured to a supporting member and having a plate-form bottom portion which has a bolt accommodating aperture therein for alignment with said threaded sleeve, said bottom portion having an upwardly extending flange at each longitudinal side edge thereof and inwardly extending means on said flanges overlying portions of said nut base to limit upward movement of the base with respect to said bottom portion, said bottom portion having a pair of opposed integral tongues the free ends of which project toward said aperture and underly said nut base, each said tongue having a portion bent upwardly and then downwardly about bend lines transverse to the longitudinal axis of said anchor cage to form a transverse crimped rib projecting into the path of movement of said nut base.

4. The combination of claim 3 wherein the inwardly extending means on the flanges comprise longitudinally spaced integral extensions at least one of which, at each side of the anchor cage, projects inwardly over said base.

5. The combination of claim 3 wherein the inwardly extending means on the flanges comprise two inwardly projecting long extension located respectively on the two flanges, out of line with each other along the length of the bottom portion and two relatively rigid short extensions located respectively on the two flanges opposite to said first named extensions, respectively.

References Cited in the file of this patent
UNITED STATES PATENTS

| | | |
|---|---|---|
| 2,144,350 | Swanstrom | Jan. 17, 1939 |
| 2,404,372 | Hallock | July 23, 1946 |
| 2,413,669 | Whitcombe | Dec. 31, 1946 |
| 2,542,375 | Torresen | Feb. 20, 1951 |
| 2,705,991 | Reiner | Apr. 12, 1955 |